United States Patent [19]

Bell

[11] Patent Number: 4,551,413

[45] Date of Patent: Nov. 5, 1985

[54] RECORDING ELEMENT FOR OPTICAL DATA STORAGE

[75] Inventor: Vivien L. Bell, London, England

[73] Assignee: Minnesota Mining and Manufacturing Company, St. Paul, Minn.

[21] Appl. No.: 564,938

[22] Filed: Dec. 23, 1983

[30] Foreign Application Priority Data

Dec. 31, 1982 [GB] United Kingdom ............... 8237040

[51] Int. Cl.$^4$ ............................................. G03C 5/24
[52] U.S. Cl. .................................. 430/270; 430/945; 430/495; 430/496
[58] Field of Search ............... 430/945, 578, 270, 495, 430/496

[56] References Cited

U.S. PATENT DOCUMENTS

| | | | |
|---|---|---|---|
| 2,813,802 | 11/1957 | Ingle et al. | 117/33.3 |
| 2,955,939 | 10/1960 | Brooker et al. | 430/578 |
| 3,194,805 | 7/1965 | Brooker et al. | 430/577 |
| 3,847,621 | 11/1974 | Nishina et al. | 430/945 |
| 3,867,146 | 2/1975 | Nakazawa et al. | 430/945 |
| 4,000,492 | 12/1976 | Willens | 346/1 |
| 4,137,077 | 1/1979 | Credelle et al. | 96/1.1 |
| 4,148,636 | 4/1979 | Credelle et al. | 96/1.1 |
| 4,212,672 | 7/1980 | Mihara et al. | 430/945 |
| 4,230,939 | 10/1980 | de Bont et al. | 235/488 |
| 4,259,433 | 3/1981 | Mizobuchi et al. | 430/296 |
| 4,364,986 | 12/1982 | Zwanenburg et al. | 428/156 |
| 4,460,665 | 7/1984 | Kunikane et al. | 430/945 |
| 4,465,767 | 8/1984 | Oba et al. | 430/945 |

FOREIGN PATENT DOCUMENTS

| | | |
|---|---|---|
| 2005155 | 4/1979 | United Kingdom . |
| 2005457 | 4/1979 | United Kingdom . |
| 2079031 | 1/1982 | United Kingdom . |

Primary Examiner—Won H. Louie
Attorney, Agent, or Firm—Donald M. Sell; James A. Smith; Mark A. Litman

[57] ABSTRACT

An optical recording element on which information can be recorded and read directly afterwards by means of laser light in which the element comprises, as a recording medium, an effective amount of one or more dyes of the formula:

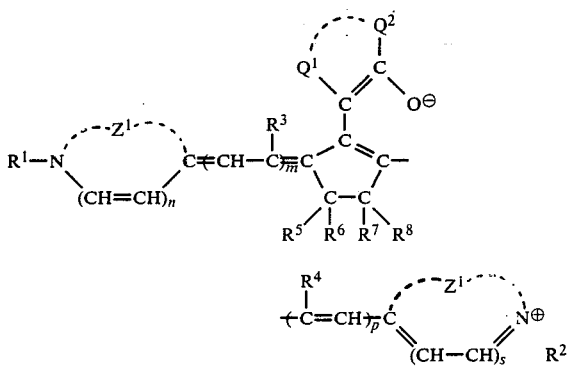

(I)

in which:
$m+p=2$,
$n$ is 0 or 1,
$s$ is 0 or 1,
$Z^1$ and $Z^2$ independently represent the non-metallic atoms necessary to complete a heterocyclic nucleus of the type present in cyanine dyes,
$R^1$ and $R^2$ independently represent an alkyl or substituted alkyl, alkenyl, substituted alkenyl or aralkyl group of up to 20 carbon atoms,
$R^3$ and $R^4$ independently represent a hydrogen atom or an alkyl, substituted alkyl, alkenyl, substituted alkenyl, alkoxy or substituted alkoxy group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, or
one of $R^5$ and $R^6$ together with one of $R^7$ and $R^8$ represent the necessary atoms to complete a carbocyclic ring in which case the others of $R^5$ to $R^8$ are absent,
$Q^1$ and $Q^2$ together represent the non-metallic atoms necessary to complete an acidic nucleus of the type present in oxonol or merocyanine dyes.

25 Claims, 1 Drawing Figure

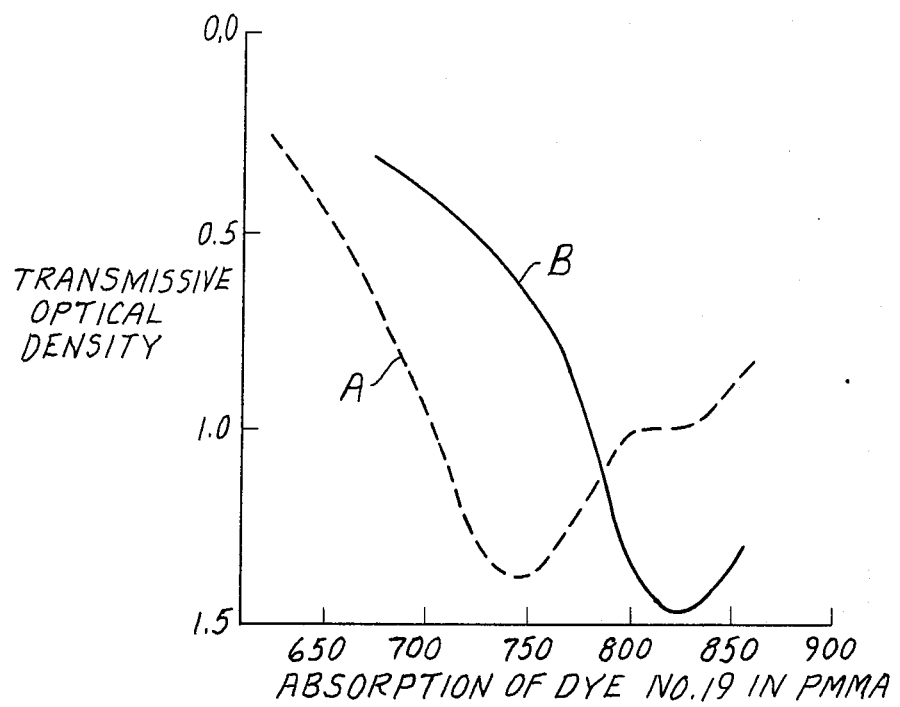

RECORDING ELEMENT FOR OPTICAL DATA STORAGE

FIELD OF THE INVENTION

This invention relates to an optical recording element in which information can be recorded and read by means of laser light and, in particular, to an optical recording element comprising a substrate having on at least one side a recording layer including one or more compounds selected from a particular class of cyanine dyes.

BACKGROUND OF THE INVENTION

Continuing advances in information handling technology have led to the requirement for data storage and retrieval systems capable of handling extremely large volumes of information. A proposed method for satisfying this demand is an optical recording which allows recording and accessing of information at very high data rates with a much greater recording density and archivability than is possible with magnetic recording. A highly focussed laser beam is utilized to record and recover information on the optical recording media. The optical recording media may have any desired format; e.g., disc, card, etc. The selection and alignment of diode lasers into an optical recording system is discussed by Bartolini et al. in I.E.E.E. Journal of Quantum Electronics, 1981, p. 69, and both read and write apparatus are disclosed in British Patent Application No. 2,016,747A.

Many types of recording media have been disclosed for laser writing and these can be divided into two basic sorts: those which require processing after writing and those which can be read immediately after writing. It is the latter type, possessing "direct read after write" capability and commonly known as "DRAW" media, which are of particular interest.

In order to be useful as a light absorbing layer for the recording element, materials must be able to be applied to a substrate in the form of a thin, smooth layer of high optical quality and predetermined thickness and they must absorb at the frequency of the optical source. Various materials have been proposed for the recording media of DRAW systems, including, for example, thin metal films, metal-impregnated polymers and organic dyes. In these cases the laser beam provides a pulse of heat energy to the recording medium which causes a change in surface morphology; i.e., formation of a bump or crater, by ablation, vaporization or melting.

The most common DRAW media are the thin metal films and, of these, tellurium containing mixtures as disclosed in Lou et al., J. Vac. Sci. Technol., 1981, 18, 78, are widely used. However, the preparation of recording elements incorporating tellurium is by a relatively expensive vacuum sputtering technique in which the metal does not adhere well to the substrate. It also presents environmental complications because of its toxicity.

Examples of the use of metal-impregnated polymers in recording elements include the silver-impregnated in gelatin systems disclosed in U.S. Pat. No. 4,278,758. Greater sensitivity is claimed for these systems than for the tellurium films, but high concentrations of expensive silver are used in the recording medium.

A possible alternative system uses organic compounds in place of expensive metals. As well as providing advantages of cost, the thermal properties of organic compounds are generally superior since they possess low thermal conductivity and low melting/decomposition temperatures. With the use of such systems it is important that the absorption of dye therein corresponds as closely as possible with the emission of the recording laser. Of the various lasers available, semiconductor laser diodes have the advantages, over conventional gas lasers, of low cost and size and the possibility of easy signal modulation. The problem is, therefore, one of finding organic materials which have all the requisite physical properties and absorb strongly in the region compatible with laser diodes; i.e., the near infrared region of the spectrum, wavelengths between 700 and 1400 nm. The use of hydroxy-squarylium dye for optical data storage is disclosed in Jipson and Jones, J. Vac. Sci. Technol., 1981, 18, 105, but the dye absorbs strongly only in the visible region of the spectrum. Phthalocyanines are disclosed in European Patent Application No. 79200789 and can readily be vapor coated onto a substrate. However, their sensitivity is reduced by their relatively high ablation temperature (300° to 400° C.) and crystallization is always a danger when a coating of pure dye is used.

Dye-in-polymer systems go some way towards avoiding crystallization. An organometallic complex has also been coated out in a polymeric binder. Crowly et al., IBM Technical Dislcosure Bull, 24, No. 11B, 1982, reports that a nickel dithiene complex dissolved in a film of polystyrene undergoes ablation-type holeburning with infrared irradiation, but no data has been given on the sensitivity of the system. Law et al., Appl. Phys. Lett., 1981, 39, 718, discloses a thiacyanine dye coated in poly(vinyl acetate) solution without any evidence for the formation of microcrystals. However, the intense monomer absorption band observed in solution was lost when the dye was spread in a polymeric binder and the resultant absorption was significantly blue-shifted and reduced in intensity.

As reported above, dye-polymer systems suitable as optical data storage recording media require near infrared absorbing dyes which are compatible with laser diode emission. Heptamethine and longer chain cyanine dyes are known which have absorption maxima in the near infrared region of the spectrum, together with exceptionally high extinction coefficients. However, simple near infrared absorbing cyanine dyes are unsuitable for use as optical data storage media both from solubility considerations and because, when coated out in polymeric binders, their absorption curve is broadened and shifted hypsochromically as reported in Law et al., Appl. Phys. Lett., 1981, 39, 718.

It is highly desirable that the recording layers of an optical recording element have a small thickness; e.g., below 1 $\mu$m and an optical density of about 0.4 or higher. Whilst it has been possible to achieve these desirable criteria with recording layers which consist entirely of dye, heretofore it has not been readily possible to manufacture dye-containing layers of a film-forming polymeric binder which have the desired properties without employing specific binder formulations. In particular, many known dye/binder systems must be used in comparatively large thicknesses of more than 1 $\mu$m to be able to realize the sufficiently high optical density of the layer.

One particular dye/binder system which is able to achieve the desired criteria is disclosed in U.S. Pat. No. 4,364,986. This patent discloses an information recording element for optically recording optically readable information comprising a disc-shaped substrate on one surface of which there is present an optically readable servo track which has at least partially a relief structure of servo areas situated alternately at a higher and lower level and on which servo track there is present, as a recording layer, a mixture of a dye and a copolymer (1:1) of methyl vinyl ether and maleic anhydride or a semi-ester of said copolymer and an aliphatic alcohol which may be substituted with an aromatic radical and contains 1 to 8 carbon atoms.

SUMMARY OF THE INVENTION

According to the present invention there is provided an optical recording element in which information can be recorded and read directly afterwards by means of laser light, the element comprising, as a recording medium, an effective amount of one or more dyes of the formula:

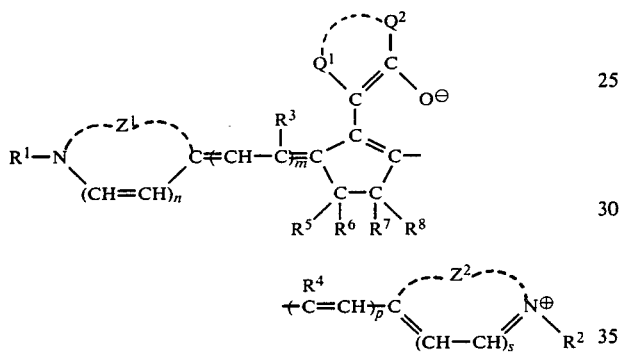

(I)

in which:
m+p=2, preferably m=p=1,
n is 0 or 1,
s is 0 or 1,
$Z^1$ and $Z^2$ independently represent the non-metallic atoms necessary to complete a heterocyclic nucleus of the type present in cyanine dyes,
$R^1$ and $R^2$ independently represent an alkyl, substituted alkyl, alkenyl, substituted alkenyl or aralkyl group of up to 20 carbon atoms,
$R^3$ and $R^4$ independently represent a hydrogen atom or an alkyl, substituted alkyl, alkenyl, substituted alkenyl, alkoxy or substituted alkoxy group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, or
one of $R^5$ and $R^6$ together with one of $R^7$ and $R^8$ represent the necessary atoms to complete a carbocyclic ring (e.g., a benzene ring) in which case the others of $R^5$ to $R^8$ are absent,
$Q^1$ and $Q^2$ together represent the non-metallic atoms necessary to complete an acidic nucleus of the type present in oxonol or merocyanine dyes.

DESCRIPTION OF THE DRAWING

The FIGURE shows absorption curves of the Transmissive Optical Density versus Wavelength of radiation (nm) for coatings of 20 mg of Dye No. 19 and 80 mg of poly(methyl methacrylate) in 1 ml solutions. Two separate solvent blends are shown. Curve A is a blend of 2% (volume) ethanol in trichloromethane. Curve B is a blend of 10% ethanol in trichloromethane.

DETAILED DESCRIPTION OF THE INVENTION

The elements of the present invention use a particular highly advantageous class of chain-substituted cyanine dyes. The dyes are advantageous not only in respect of their improved solubility in solvent and binder, but also their spectral characteristic in the near infrared region of the spectrum. The dyes retain a very high absorption in the near infrared when present in a layer in an optical recording element. The combination of infrared wavelength of absorption specificity, high extinction coefficient values and solubility leads to these dyes being particularly useful for laser addressed optical recording elements as will be described in detail hereinafter.

The heterocyclic nuclei formed by $Z^1$ and $Z^2$ may be any of the wide range of nuclei known in the cyanine dye art. Generally, $Z^1$ and $Z^2$ each represent the non-metallic atoms necessary to complete a heterocyclic nucleus containing 5 to 6 atoms in the heterocyclic ring, the nucleus optionally possessing substituents. Preferably, the heterocyclic ring is composed of ring atoms selected from C, N, O, S and Se. Examples of such heterocyclic nuclei include:

the thiazole series; e.g., thiazole, 4-methylthiazole, 4-phenylthiazole, 5-methylthiazole, 5-phenylthiazole, 4,5-dimethylthiazole, 4,5l-diphenylthiazole, 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the naphthothiazole series; e.g., naphtho[1,2]-thiazole, naphtho[2,1]thiazole, 5methoxynaphtho-[2,1]-thiazole, 5-ethoxynaphtho[2,1]thiazole, 8-methoxynaphtho[1,2]thiazole, 7-methoxynaphtho[1,2]thiazole;

the thianaphtheno-7',6',4,5-thiazole series; e.g., 4'-methoxythianaphtheno-7',6',4,5,-thiazole;

the oxazole series; e.g., 4-methyloxazole, 5-methyloxazole, 4-phenyloxazole, 4,5-diphenyloxazole, 4-ethyloxazole, 4,5-dimethyloxazole, 5-phenyloxazole;

the benzoxazole series; e.g., benzoxazole, 5-chlorobenzoxazole, 5-methylbenzoxazole, 5-phenylbenzoxazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the naphthoxazole series; e.g., naphtho[1,2]oxazole, naphtho[2,1]oxazole;

the selenazole series; e.g., 4-methylselenazole, 4-phenylselenazole;

the benzoselenazole series; e.g., benzoselenazole, 5-chlorobenzoselenazole, 5-methylbenzoselenazole, 5-methoxybenzoselenazole, 5-hydroxybenzoselenazole, tetrahydrobenzoselenazole;

the naphthoselenazole series; e.g., naphthol[1,2-]selenazole, naphtho[2,1]selenazole;

the thiazoline series; e.g., thiazoline, 4-methylthiazoline;

the 2-quinoline series; e.g., quinoline, 3-methylquinoline, 5-methylquinoline, 7-methylquinoline, 8-methylquinoline, 6-chloroquinoline, 8-chloroquinoline, 6-methoxyquinoline, 6-ethyoxyquinoline, 6-hydroxyquinoline, 8-hydroquinoline;

the 4-quinoline series; e.g., quinoline, 6-methoxyquinoline, 7-methylquinoline, 8-methylquinoline;

the 1-isoquinoline series; e.g., isoquinoline, 3,4-dihydroisoquinoline;

the 3-isoquinoline series; e.g., isoquinoline;

the benzimidazole series; e.g., 1,3-diethylbenzimidazole, 1-ethyl-3-phenylbenzimidazole;

the 3,3-dialkylindolenine series; e.g., 3,3-dimethylindolenine, 3,3,5-trimethylindolenine, 3,3,7-trimethylindolenine;

the 2-pyridine series; e.g., pyridine, 5-methylpyridine; and the 4-pyridine series; e.g., pyridine.

Preferably $Z^1$ and/or $Z^2$ complete a benzothiazole nucleus or a 3,3-dialkylindolenine nucleus.

Preferably the groups $R^1$ and $R^2$ contain less than 8 carbon atoms. More preferably $R^1$ and $R^2$ are lower alkyl groups containing up to 4 carbon atoms. The alkyl groups may contain any substituent which does not deleteriously effect the properties of the dye as known in the cyanine art. Suitable substituted alkyl groups include alkoxyalkyl, benzyl and carboxyalkyl.

Preferably $R^3$ and $R^4$ represent a hydrogen atom or a lower alkyl group containing 1 to 4 carbon atoms.

Preferably $R^5$ to $R^8$ are hydrogen. However, certain substituted cyclopentanones are commercially available which may be used as intermediates in the preparation of the dyes of formula (I), e.g., 3-alkyl and 3-aryl materials such as 3-methylcyclopentanone and 3-phenylcyclopentanone and accordingly one of $R^5$ to $R^8$ may readily represent these substituents.

The cyclic acid nuclei completed by the groups $Q^1$ and $Q^2$ preferably have the ring atoms selected from C, S, N, O and Se. Suitable moieties are derived from the following nuclei which may additionally possess substituents: 1,3-indandione, pyrazolone, isoxazolone; e.g., 3-phenylisoxazolone, oxindole, 2,4,6-trioxohexahydropyrimidine, 2-thio-4,6-dioxohexahydropyrimidine, 3,5-pyrazolidinedione, 2(3H)-imidazole[1,2-a]pyridone, 5,7-dioxo-6,7-dihydro-5-thiazolo[3,2-a]pyrimidine, 2-thio-2,4-oxazolidinedione, thianaphthenonedioxide, 2-thio-2,4-thiazolidinedione, 2,4-thiazolidinedione, thiazolidione, 4-thiazolinone, 2-imino-2,4-oxazolinone, 2,4-imidazolinedione, 2-thio-2,4-imidazolinedione, 5,5-dialkyl-1,3-cyclohexanedione including 5,5-dimethyl-1,3-cyclohexanedione (dimedone) and isopropylidine malonate (Meldrum's acid).

Dyes of formula (I) are known. U.S. Pat. No. 3,194,805 discloses a class of merocyanine and holopolar dyes containing arylene-chain substitution and their use as spectral sensitizing dyes for silver halide emulsions. Three of the dyes disclosed therein are within the scope of formula (I). U.S. Pat. No. 2,955,939 discloses a class of dyes for spectral sensitization of silver halide, one of the dyes disclosed being within the scope of formula (I). Our copending European Patent Application No. 83304664.2 discloses dyes of formula (I) together with their use in antihalation or acutance dyes.

There is no disclosure nor suggestion in the prior art of the use of the dyes in recording media for optical data storage. The recording elements of the present invention do not possess photosensitive materials; e.g., silver halide, in association with the dye and rely upon the dye to absorb at the wavelength of the recording radiation.

The dyes of formula (I) absorb in the near infrared when coated out in a polymeric binder and retain a high extinction coefficient at the absorption maximum.

Preferred dyes for use in the invention are those in which the cyclic nucleus completed by $Q^1$ and $Q^2$ has the general formula:

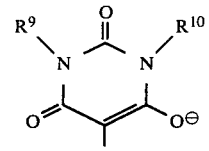

in which:

$R^9$ and $R^{10}$ independently represent a hydrogen atom, an alkyl or cycloalkyl group each of which may be substituted; e.g., hydroxyalkyl, alkoxy-alkyl, alkoxycarbonyl, polyoxyalkyl, alkenyl or substituted alkenyl, an aryl group which may be substituted, or an aralkyl group, any of which groups may contain up to 25 carbon atoms. Preferably $R^9$ and $R^{10}$ together contain at least 8 carbon atoms and are aliphatic groups, or at least one of $R^9$ and $R^{10}$ is an alkyl chain substituted by solubility enhancing groups; e.g., alkoxy substituents; more preferably at least one of $R^9$ and $R^{10}$ represents an alkyl group containing at least 8 carbon atoms.

Dyes containing such a moiety have particularly advantageous properties for the present invention, since substitution of this type has the benefit of enhancing the solubility of the dyes in both organic solvents and polymeric binders.

The dyes of formula (I) may be prepared according to the methods described in U.S. Pat. No. 2,955,939 and our copending European Patent Application No. 83304664.2. The synthesis involves the following stages:

(1) Condensation of an α-ketomethylene compound with a cyclopentanone.

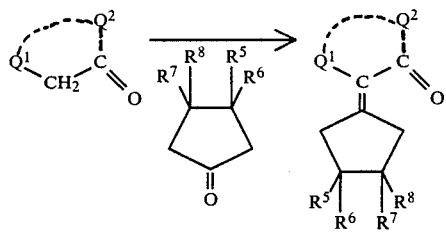

(2) The symmetrical dyes may be prepared by condensation of the cyclopentylidene intermediate with a 2-(acetanilidovinyl) derivative of a quaternized heterocyclic base of the type used in cyanine dyes:

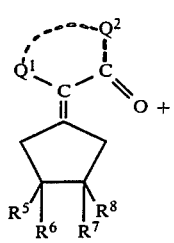

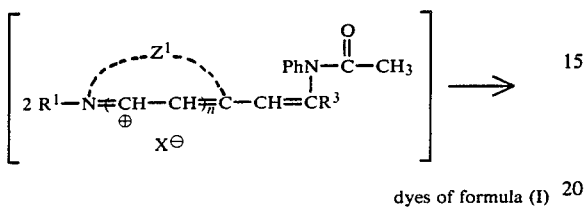

dyes of formula (I)

The asymetrical dyes may be prepared by a related two-step mechanism.

The following Tables I and II report dyes of formula (I) which have been prepared.

TABLE I

Dyes of formula (I) in which $R^3 = R^4 = H$, $R^5 = R^6 = R^7 = R^8 = H$, $n = s = 0$, $m = p = 1$.

| Dye No. | $Z^1$ and $Z^2$ complete | $R^1$ | $R^2$ | $Q^1$ and $Q^2$ complete | $\lambda_{max}$ (nm) |
|---|---|---|---|---|---|
| 1 | benzothiazole | $C_2H_5$ | $C_2H_5$ | 1,3-indandione | 795 |
| 2 | benzothiazole | $C_2H_5$ | $C_2H_5$ | 1,3-diethyl-2-thio-4,6-dioxohexahydro-pyrimidine | 809 |
| 3 | benzothiazole | $C_2H_5$ | $C_2H_5$ | 3-phenylisoxazolone | 790 |
| 4 | benzothiazole | $C_2H_5$ | $C_2H_5$ | thianaphthenone dioxide | 734 |
| 5 | benzothiazole | $R^1 = R^2 = CH_3O(CH_2)_2$ | | 1,3-diethyl-2,4,6-trioxo-hexahydro-pyrimidine | 826 |
| 6 | 5-methyl-benzo | $C_2H_5$ | $C_2H_5$ | 1,3-diethyl-2,4,6-trioxo-hexahydro-pyrimidine | 823 |
| 7 | benzothiazole | $C_2H_5$ | $C_2H_5$ | 2,2-dimethyl-4:6-diketo-1:3-dioxan | 806 |
| 8 | benzothiazole | $C_2H_5$ | $C_2H_5$ | 5,5-dimethyl-1,3-cyclohexane-dione | 803 |
| 9 | 3,3-dimethyl-indolenine | $CH_3$ | $CH_3$ | 1-dodecyl-3-ethyl-2,4,6-trioxo-hexa-hydropyrimidine | 773 |
| 10 | 3,3-dimethyl-indolenine | $CH_3$ | $CH_3$ | 1,3-dioctyl-2,4,6-tri-oxo-hexahydro-pyrimidine | 774 |
| 11 | benzothiazole | $C_2H_5$ | $C_2H_5$ | 1-allyl-3-dodecyl-2-thio-4,6-dioxo-hexa-hydropyrimidine | 814 |
| 12 | benzothiazole | $C_2H_5$ | $C_2H_5$ | 1,2-diphenyl-3,5-pyrazolidine-dione | 793 |
| 13 | benzothiazole | $C_2H_5$ | $C_2H_5$ | 2,2-tetramethylene-4,6-diketo-1,3-dioxan | 810 |
| 14 | benzothiazole | $C_2H_5$ | $C_2H_5$ | 2-dimethylamino-4,6-dioxo-hexa-hydropyrimidine | 808 |
| 15 | benzothiazole | $C_2H_5$ | $C_2H_5$ | 1-methyl-3,5-pyrazolidine-dione | 789 |
| 16 | benzothiazole | $C_2H_5$ | $C_2H_5$ | 1-phenyl-3,5-pyrazolidine-dione | 791 |
| 17 | benzothiazole | $C_2H_5$ | $C_2H_5$ | 1-methoxycarbonyl-3,5-pyrazolidine-dione | 799 |
| 18 | benzothiazole | $C_2H_5$ | $C_2H_5$ | coumarin | 813 |
| 19 | benzothiazole | $C_2H_5$ | $C_2H_5$ | 1,2-dibenzyl-3,5-pyrazolidinedione | 795 |
| 20 | benzothiazole | $C_2H_5$ | $C_2H_5$ | 2-H—pyrido[1,2a]-8-methyl pyrimidine-2,4-(3H)—dione | 825 |

TABLE I-continued

Dyes of formula (I) in which $R^3 = R^4 = H$, $R^5 = R^6 = R^7 = R^8 = H$, $n = s = 0$, $m = p = 1$.

| Dye No. | $Z^1$ and $Z^2$ complete | $R^1$ | $R^2$ | $Q^1$ and $Q^2$ complete | $\lambda_{max}$ (nm) |
|---|---|---|---|---|---|
| 21 | 3,3-dimethyl-indolenine | $CH_3$ | $CH_3$ | 1-phenyl-3,5-pyrazolidine-dione | 751 |
| 22 | 3,3-dimethyl-indolenine | $CH_3$ | $CH_3$ | 2-H—pyrido[1,2a]-8-methyl pyrimidine-2,4-(3H)—dione | 791 |

TABLE II

Dyes of formula (I) in which $R^1 = R^2 = C_2H_5$, $R^3 = R^4 = H$, $R^5 = R^6 = R^7 = R^8 = H$, $n = s = 0$, $m = p = 1$.

$Q^1$ and $Q^2$ complete

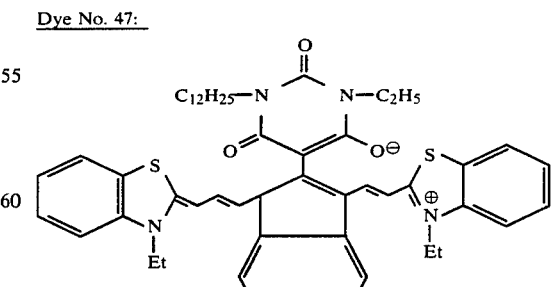

| Dye No. | $Z^1$ and $Z^2$ complete | $R^9$ | $R^{10}$ | $\lambda_{max}$ (nm)* |
|---|---|---|---|---|
| 23 | benzothiazole | $C_2H_5$ | $C_2H_5$ | 807 |
| 24 | benzothiazole | $CH_3$ | $CH_3$ | 816 |
| 25 | benzothiazole | $n-C_4H_9$ | $n-C_4H_9$ | 817 |
| 26 | benzothiazole | $CH_3O(CH_2)_2$ | $C_2H_5$ | 818 |
| 27 | benzothiazole | cyclohexyl | cyclohexyl | 818 |
| 28 | benzothiazole | benzyl | benzyl | 817 |
| 29 | benzothiazole | $C_{12}H_{25}$ | $C_2H_5$ | 822 |
| 30 | benzothiazole | $CH_3O(CH_2)_2$ | $CH_3O(CH_2)_2$ | 817 |
| 31 | benzothiazole | $C_{12}H_{25}$ | $C_{12}H_{25}$ | 820 |
| 32 | benzothiazole | $C_{12}H_{25}$ | $CH_3$ | 819 |
| 33 | benzothiazole | $C_{18}H_{37}$ | $CH$ | 818 |
| 34 | benzothiazole | $C_{12}H_{25}$ | $C_3H_7$ | 806 |
| 35 | benzothiazole | $C_{12}H_{25}$ | $H$ | 807 |
| 36 | benzothiazole | $t-C_4H_9$ | $t-C_4H_9$ | 803 |
| 37 | benzothiazole | $C_3H_7$ | $HO(CH_2)_2$ | 812 |
| 38 | benzothiazole | $C_3H_7$ | $C_{18}H_{37}$ | 809 |
| 39 | benzothiazole | $C_8H_{17}$ | $C_8H_{17}$ | 807 |
| 40 | benzothiazole | $C_6H_5$ | $C_{12}H_{25}$ | 810 |
| 41 | benzothiazole | $C_{18}H_{37}$ | $C_2H_5$ | 807 |
| 42 | benzothiazole | $C_3H_7$ | $C_2H_5O.COCH_2$ | 807 |
| 43 | benzothiazole | $C_6H_5$ | $C_8H_{17}$ | 808 |
| 44 | benzoxazole | $C_2H_5$ | $C_2H_5$ | 730 |
| 45 | benzothiazole | $C_{18}H_{37}$ | $C_6H_5$ | 817 |
| 46** | benzothiazole | $C_2H_5$ | $C_{12}H_{25}$ | 804 |

*Measured in 90% MeOH, 10% $CHCl_3$
**$R^8 = CH_3$

Other dyes suitable for use in the recording medium for optical data storage include:

Dye No. 47:

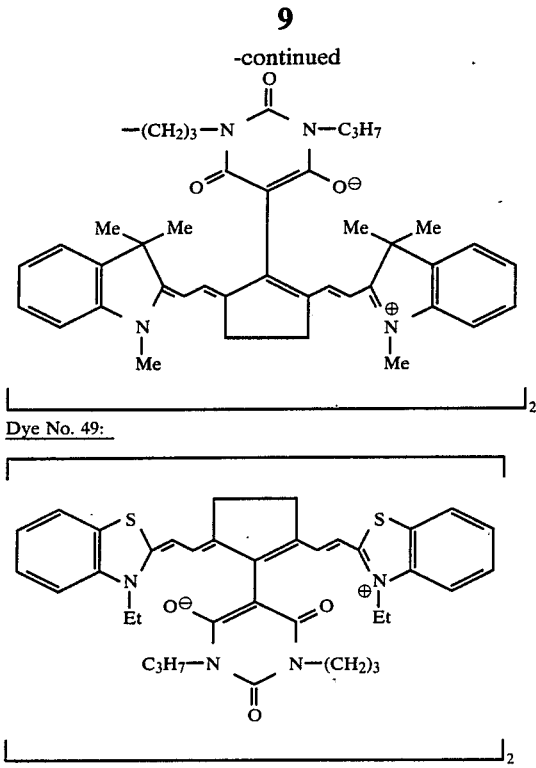

Dye No. 49:

Under certain conditions of solvent and binder, dyes of formula (I) may, on coating and drying, lose some density at the primary near infrared absorption peak and develop a secondary shorter wavelength absorption peak. It has been found that this undesirable phenomenon is inhibited by the incorporation of bulky aliphatic groups onto the moiety completed by $Q^1$ and $Q^2$. Preferably the bulky groups are alkyl groups containing at least 18 carbon atoms, more preferably alkyl groups containing at least 12 carbon atoms.

In some cases the undesirable development of the secondary absorption peak can be entirely suppressed by the judicious choice of solvent mixture and polymer. The accompanying drawing shows absorption curves of coatings of Dye No. 29 and shows the effect of a change of solvent ratio upon the absorption curve of coatings of the dye in poly(methylmethacrylate), (PMMA). It can be seen that increasing the alcohol concentration to 10% reduces the secondary absorption peak at 750 nm and gives only the desired absorption peak at 820 nm. Taking steps to avoid such a shift in absorption is desirable for good sensitivity as it ensures that the recording media has good sensitivity when used with laser diodes emitting in the restricted range 800 to 850 nm.

As alternative laser sources become commercially available from 700 to 1400 nm, then dyes can be chosen from the compounds covered by formula (I) and can be used together to provide good sensitivity at wavelengths matching the source emission.

The optical recording element of the invention may be in the form of a support having a recording layer coated thereon comprising one or more dyes of formula (I) optionally together with a binder, or the element may be in the form of a self-supporting structure; e.g., a cast film, comprising a dye of formula (I) and a binder. The dye must be present in the region of the surface of the recording layer in a sufficient amount to absorb an effective amount of the exposing radiation to produce a visible mark on the surface thereof. It is not possible to generally quantify the minimum amount of dye required for optical recording either in terms of coating weights or optical density of the recording layer or element since the minimum amount will vary according to the dye, the thickness of the recording layer or the construction of a self-supporting element and the binder present. For example, a thick layer of recording medium having a high optical density and coating weight of dye may have inferior performance to a thin layer having a lower optical density and coating weight.

Sufficient energy must be absorbed during writing to cause differentiation of exposed (or written) areas from those non-exposed. Most commonly a difference in reflectivity of the composition is measured: depending on the incidence angle of the writing laser beam the greater or lesser reflectivity may be accommodated. Alternatively, there may be a change in the optical transmission of the layer after writing. Such changes may be caused by the creation of pits or relief areas, through the melting or vmporization of the recording layer. Formation of minute gas pockets, microcrystallites or other discontinuities is also envisaged. These changes must be detectable by the reading laser which may, as with the writing laser, present an acute or orthogonal angle of incidence to the recording layer.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, July 1978, 487, discloses, in general, that optimum write situations are obtained when the recording layer has a thickness about one quarter the wavelength of the recording light. In recording elements of the present invention sensitivity is improved as the thickness of the recording layer is reduced below 1 m and in preferred embodiments the thickness is in the range from 30 to 400 nm, while a broader range of 10 to 1,000 nm is generally believed to be useful.

The recording layer is generally coated onto a substrate which acts as a support. The support may be substantially any solid material, either flexible or rigid including polymeric materials; e.g., polyacrylates, polyamides, polycarbonates, polyesters, polyolefins, polyurethanes and polyvinyl resins; ceramic or glass materials; fibrous materials and metals. The support must be stable enough to avoid deformation during writing of information. Also the surface of the substrate which is to be coated should be smooth and free of random surface irregularities, although it may be flat, pre-grooved or may include predetermined surface irregularities capable of being read by laser light in the final element to provide an indexing function or the like.

A light reflecting layer is preferably provided between the substrate and the recording layer. Suitable materials include aluminium, copper, chromium, gold and rhodium. The thickness of the light reflecting layer should be sufficient to reflect a significant amount (e.g., at least 20%, preferably at least 50%) of the recording light. Leveling and/or priming layers may also be applied to the substrate before application of the reflective coating and/or dye containing layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beams used in reading and writing on the recording layer. Examples of the construction of such recording elements are disclosed in Bartolini et al., J. Quantum Electronics, 1981, page 69.

In the recording elements of the present invention the recorded information is carried in the form of marks; e.g., about 1 micron in size, in the recording layer. Because of the high density of the information, dust or other foreign material on the top surface of the recording layer would cause significant errors. Therefore, in one embodiment of recording elements of the present invention a protective layer at least 0.6 $\mu$m thick is provided on top of the recording layer to separate dust and other particles from the recording layer. The laser beam is sharply convergent at the top surface of the recording layer and accordingly any dust particles on the protective layer would be out of focus with respect to the laser beam and thus not affect the reading and writing process. The protective layer can be made of any material which is transparent to laser beams used in reading and writing on the recording layer and it can either be directly in contact with the recording layer or separated from it by an air, unreactive gas; e.g., nitrogen, gap or vacuum gap. Suitable materials which can be used for the protective coating include glass, poly(-methyl methacrylate), polycarbonates and polyesters.

Preferably the recording elements of the invention are double-sided comprising a planar substrate optionally in the form of a disc, having on each major surface a reflecting layer, above which is coated the recording medium and optionally a protective layer. Alternatively two disc-shaped substrates bearing firstly a reflective layer and secondly an absorbing layer with an optional overcoated protective layer, may be adhered together by the surfaces not bearing the recording layer.

A wide range of organic binders may be used to prepare the recording layer and elements for use in the invention. The binder should be capable of film formation in the recording element and be pellucid: cloudiness or milkiness of the binder at the writing laser emission are undesirable in the recording element. The binder may be colored and exhibit a degree of infrared absorbance at the writing laser emission. The binder must also adhere to the adjacent layers of the recording element; e.g., substrate, reflecting spacer or protective layers.

In general, thermoplastic polymers are preferred, particularly those polymers having a Tg in the range 70° to 115° C. or capable of being formulated with plasticizers to provide a binder medium having a Tg in this range. Useful binders include cellulose acetate butyrate, polystyrene, polysulfonamide, polycarbonates (e.g., those commercially available from General Electrics Plastics under the trade name Lexan), cellulose nitrate, hydroabietyl alcohol (e.g., that commercially available from Hercules Chemical Company under the trade name Abitol AUK257), polyesters; e.g., polyacrylates [poly(ethyl methacrylate), poly(methyl methacrylate) poly(isobutylmethacrylate), poly(biphenylacrylate)], poly(vinyl butyral), poly(vinyl acetate), polyethers, polyamines, poly(vinyl chloride), poly(vinyl alcohol) and copolymers such as arising from vinyl chloride and vinyl acetate monomers, and hydrogenated rosin ester (e.g., Staybelite Ester 10, commercially available from Hercules Powder Company). These binders may be used either singly or in combination with another. Preferred binders include polystyrene, poly($\alpha$-methylstyrene) and poly(methy methacrylate), either alone or containing Staybelite Ester 10.

Anionic binders such as those derived from carboxylic acid containing copolymers may also be used. Such binders may be associated with the dye cation.

Crosslinked binders; e.g., epoxy resins, may also be used but generally with some loss in sensitivity. Both natural and synthetic binders are useable.

It is generally preferred that the recording layer be an amorphous material since pronounced crystallization or graininess in the film may cause increased noise levels making the material unsuitable as a high quality recording medium. However, it is possible that the dye be present in the recording medium as microcrystals. Accordingly, the dye may either be solubilized in the binder or very finely dispersed. The former is preferred. For dispersions the particle size must be very much less than 1 micron.

Crystallinity in the dye/polymer films can be detected visually by haziness of the coated layer or in extreme cases, as a metallic, highly reflective appearance to the film compared to amorphous films which present a completely transparent appearance. Crystallization may also be assessed through the use of X-ray diffraction.

The particular dye/binder ratio selected is a balance between one end of the range where a high dye/binder ratio leads to the possibility of undesirable crystallization, whilst at the other extreme too little dye may result in insufficient heat transfer from the dye to the binder to cause melting and hence prevent recording. In a control experiment without dye present, irradiation of the polymeric binder with the laser diode caused no marking of the surface. Another limitation on increasing the dye/binder ratio is the solubility of the dye in the coating solution. In practice, the percentage of binder relative to the total weight of dye and (any) binder may range from 0 to 97%. Generally when binder is present it is employed in the range 5 to 80%.

In order to achieve the desired dye/binder ratios in a coating solution and obtain viscosities suitable for spreading, the solubility of the dye is preferably at least 10 mg/ml in the solvent chosen and more preferably at least 30 mg/ml. The dyes of formula (II) have the desired solubility in organic solvents as well as in polymeric binders. With such dyes, ratios of dye/polymer of 1:1 w/w can be coated from solutions containing 6% w/v total solids without crystallization occurring.

The solvent used for preparing the coating composition may be selected from a wide range of known solvents such as chlorinated solvents; e.g., chloroform, dichloromethane and 1,2-dichloroethane, or ketonic solvents; e.g., cyclohexanone, or aromatic solvents; e.g., xylene. The solvents can be used alone or in combination, the choice being governed to some extent by the particular dye/binder system and by the method of coating used.

Suitable methods of coating the compositions include handcoating, dipcoating, spincoating and webcoating.

A very suitable process is, in particular, the centrifugal spincoating process. According to this process, the substrate to be covered is laid on a turntable and a quantity of solution is then provided on the substrate. By rotating the substrate, the liquid will spread circularly over the surface of the substrate. It has been found in experiments that very thin layers can be obtained by means of the centrifuging process, the thickness of which depends inter alia on the rotation speed of the substrate and the viscosity of the solution to be spread. It has been found that layers having a thickness smaller than 1 μm are obtained if the viscosity of the solution lies in the order of magnitude of a few cP, for example, up to 10 cP, and a speed of rotation is used of approximately 500 to 2500 rpm. The percentage of solid substance in the solution should also be preferably low and generally be at most 5 to 10% by weight. Film thicknesses less than 0.3 μm can readily be achieved in this manner.

It is not essential for the dyes to be applied together with a polymeric binder and it is possible to coat the dyes on a substrate in the form of a simple solution and rapidly evaporate the solvent; e.g., in an air current, to leave an amorphous film of dye on the surface of the substrate. It has been found that such coatings provide better sensitivity, comparable to that of a dye/binder system, although in some cases, the films may have inferior stability relative to the dye/polymer systems.

In an illustrative recording system embodying the principles of the present invention, a record blank comprising a substrate coated with a reflective layer, a recording medium of the invention and optional protective layer in the form of a disc is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

An information track comprising a succession of spaced deformations is formed in the coated surface of the disc, the deformations appearing in those surface regions exposed to high-intensity beam, due to vaporization or melting of the absorptive layer material in response to the high-intensity beam exposure. Variations in the length and separation of the deformations are representative of the recorded information. Where a continuous sequence of pictures is to be recorded, a spiral information track may be formed by providing relative motion, in a radiation direction and at a constant rate during the recording between the recording beam and the rotating disc. Alternatively, in the absence of such relative motion during the recording, concentric circular information tracks may be formed.

The surface of the substrate may bear a grooved, optically transparent spacer layer, this layer being formed by a cured photopolymer. The grooves, normally concentric, are formed by exposure of the photopolymer through a mask. The grooved substrate is then optionally metallization coated with a recording layer formulation such that there is a sufficient quantity to form an optical record in each groove or band.

The result of the above-described recording process is the formation of an information record of a form which facilitates recovery of the recorded information by optical playback processes. The information track of such an information record may comprise undisturbed surface regions that exhibit very low reflectance at an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectivity after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an anti-reflection condition. A photodetector, positioned to receive light reflected from the successive regions of the information track as they pass through the path of the focussed light, develops a signal representative of the recorded information. A high readout contrast ratio (due to the large differences in reflectance of the pit regions and the intervening track regions, at the light frequency of the playback beam) is readily obtained, permitting recording of the recorded video signals with an excellent signal-to-noise ratio.

An alternative construction has a non-absorbing substrate bearing the recording medium, the recording medium being coated with a reflective layer. Here the laser's incident beam passes through the substrate to the recording medium and hence the reflective layer.

As well as finding utility as elements for writing and storing optical data and thereafter retrieving said data, the elements of the invention may be used as a master element for the production of other elements which are capable of being read by laser light. Such master elements may use dyes which exhibit lower long-term stability.

The above technique may be used to prepare substrates suitable for use in the recording elements of the invention, the substrates bearing surface irregularities to provide an indexing system or page numbering system for the resulting recording element.

The invention will now be illustrated by the following Examples.

EXAMPLE 1

Compound No. 29 (0.01 g) and poly(methyl methacrylate) (PMMA), (0.07 g), were dissolved in chloroform/ethanol (9/1 v/v), (1 ml). The mixture was allowed to stand until the polymer was completely dissolved and the solution was then coated onto subbed polyester base using a R.K. Chemicals Ltd., "K-bar" hand-coater, No. 1, and air dried. The coated base exhibited a sharp absorption at 830 nm of an optical density of 1 (O.D.=1).

EXAMPLES 2 TO 10

Polyester base was coated with a variety of dye/binder/solvent compositions by various techniques as reported in Table III in which the percentages of binder and dye are based upon the coating composition. The recording layers so generated were subjected to ablation using a Hitachi Laser Diode HLP-1400 emitting at 830 nm.

In order to obtain the ablation data, the film was passed orthogonally across the incident, pulsing, laser beam in order to obtain a number of exposures for a given power and pulse duration. Because of focussing difficulties, the film was inclined at a small angle to the orthogonal so that the laser beam passed from being out of focus through the focus point to out of focus for a given series of identical pulses. The various exposures were then examined; that with optimum focussing was selected. The diameter of this circular ablation pit was then measured.

This process was repeated for different power and pulse durations until a spot with a 1μ diameter was obtained. The power and duration figures were then noted and were regarded as the "static threshold" figures for a 1 micron spot.

The power and duration figures for the "static threshold" value were the minimum figures which will give the 1 micron spots. The power and pulse duration figures which were the minimum exposures for giving any ablation on the film were recorded as the figures which give "marks visible". These marks were of much smaller diameter than 1 μm.

The results from such ablation are shown in Table IV.

TABLE III

| Example No. | Dye No. | % w/v | Binder Polymer | Solvent Composition % | A | B | A:B ratio (v/v) | Coating Method |
|---|---|---|---|---|---|---|---|---|
| 2 | 29 | 3 | PMMA | 9 | CHCl₃ | EtOH | 9:1 | Hand coating using K bar No. 1 on subbed polyester base. |
| 3 | 29 | 1.5 | PMMA | 8 | CHCl₃ | EtOH | 9:1 | Hand coating using K bar No. 1 on subbed polyester base. |
| 4 | 29 | 1.5 | Polystyrene | 8 | CHCl₃ | EtOH | 9:1 | Hand coating using K bar No. 1on subbed polyester base. |
| 5 | 29 | 2 | PMMA | 8 | CHCl₃ | EtOH | 9:1 | Hand coating using K bar No. 1 on subbed polyester base. After drying recording layer was then over-coated with PVOH spread from 5% aqueous solution using K bar No. 3. |
| 6 | 34 | 2 | PMMA | 2 | CHCl₃ | EtOH | 9:1 | Hand coating using K bar No. 1 on subbed polyester base. |
| 7 | 34 | 2 | PMMA Staybelite E10 | 7 1 | CHCl₃ | EtOH | 9:1 | Hand coating using K bar No. 1 on subbed polyester base. |
| 8 | 26 | 2 | PMMA | 8 | CHCl₃ | EtOH | 8:2 | Hand coating using K bar No. 1 on subbed polyester base. |
| 9 | 34 | 1 | PMMA surfactant | 2 0.2 | CHCl₃ | EtOH | 9:1 | Dip coated onto copper vapor coated glass slides. |
| 10 | 34 | 2 | PMMA Staybelite E10 | 0.4 | CH₂ClCH₂Cl | EtOH | 9:1 | Spin coated onto copper vapor coated glass slides. |

TABLE IV

| Example No. | Ablation Data Exposure | Result |
|---|---|---|
| 2 | Single 4 mW pulse for 260 nsec | Static threshold for 1 μm pits |
| 3 | 9 mW/350 nsec | Static threshold for 1 μm pits |
| 4 | 9 mW/280 nsec | Static threshold for 1 μm pits |
| 5 | 9 mW/4.2 μsec | Marks visible |
| 6 | 2.2 mW/260 nsec | Static threshold for 1 μm spot |
|  | 4.4 mW/50 nsec | Marks visible |
| 7 | 8 mW/250 nsec | Static threshold for 1 μm spots |
| 8 | 9 mW/280 nsec | Static threshold for 1 μm spots |
| 9 | 4 mW/260 nsec | Static threshold for 1 μm spots |
| 10 | 10 mW/100 nsec | Marks visible |

EXAMPLES 11 TO 16

Polyester base (76 μm) was coated using a K bar No. 1 with a series of different dyes from formulations containing poly(methyl methacrylate) dissolved in chloroform/ethanol (9/1 v/v) to the limit of their solubility. The dyes used and the $\lambda_{max}$ of the coating are recorded in the following Table V.

TABLE V

| Example No. | Dye No. | $\lambda_{max}$ of coating |
|---|---|---|
| 11 | 2 | 733 nm & 819 nm |
| 12 | 7 | 829 nm & >900 nm |
| 13 | 8 | 806 nm |
| 14 | 9 | 770 nm |
| 15 | 10 | 774 nm |
| 16 | 14 | 742 nm & 830 nm |

Ablation of micron-sized pits was demonstrated in all the above Examples with pulses of 100 mW/100 ns duration or less.

EXAMPLES 17 TO 22

Polyester base (76 μm) was coated using a K bar No. 1 with Dye Nos. 29 and/or 34 in formulations containing poly(methyl methacrylate) (PMMA) dissolved in chloroform/ethanol (9/1 v/v). The dyes used, the dye/binder ratio and the ablation data obtained as in Examples 2 to 10 are reported in the following Table VI.

EXAMPLES 23 AND 24

Subbed polyester base (76 m) was coated using a K Bar No. 1 by hand, or spin coating (at 200 to 400 rpm) with a solution of dye in chloroform/ethanol. The solvent was removed quickly by evaporation in an air current leaving a dye as an amorphous film on the surface of the base.

Dye Nos. 29 and 34 were coated by this technique and the resulting films were found to have poorer mechanical and thermal stability than those using a polymeric binder but exhibited good sensitivity. The ablation data obtained as in Examples 2 to 10 are reported in the following Table VI.

TABLE VI

| Example No. | Dye No. | Dye weight ratio | Total Dye/PMMA weight ratio | Ablation threshold for minimum visible mark | Dye quantity* % |
|---|---|---|---|---|---|
| 17 | 29 | — | 2/1 | 6.8 mW/500 ns | 2.0 |
| 18 | 34 | — | 2/1 | 7.0 mW/50 ns | 2.0 |
| 19 | 34 | — | 1/10 | 6.3 mW/500 ns | 0.5 |
| 20 | 34 | — | 1/20 | 6.3 mW/950 ns | 0.5 |
| 21 | 34, 29 | 1/1 | 1/1 | 6.8 mW/500 ns | 2.0 |
| 22 | 34, 29 | 1/2 | 3/4 | 6.8 mW/260 ns | 2.0 |
| 23 | 29 | — | Dye only | 6.8 mW/410 ns | |
| 24 | 34 | — | Dye only | 6.8 mW/500 ns | |

*Dye quantity is expressed as w/v percentage of total dye present in the coating solution.

EXAMPLES 25 TO 48

Polyester base (76 μm) was coated using a K bar No. 1 with the formulations reported in the following Table VII. The $\lambda_{max}$ for each layer is reported together with ablation data for certain Examples which was obtained as described in Examples 2 to 10.

TABLE VII

| Example No. | Dye No. | Amt. | Binder in solvent | Dye solubility in formulation | $\lambda_{max}$ nm (of layer) | Ablation Data (minimum visible mark threshold) |
|---|---|---|---|---|---|---|
| 25 | 8 | 20 mg | 80 mg PMMA | 1 ml 9:1 CHCl$_3$:EtOH | not totally soluble | 725 & 820 | — |
| 26 | 9 | 15 mg | 80 mg PMMA | 1 ml 9:1 CHCl$_3$:EtOH | soluble | 770 | — |
| 27 | 9 | 15 mg | 80 mg Staybelite E10 | 1 ml 9:1 CHCl$_3$:EtOH | soluble | 785 | — |
| 28 | 9 | 15 mg | 80 mg polybiphenyl acrylate | 1 ml CHCl$_3$ | soluble | 785 | — |
| 29 | 10 | 15 mg | 80 mg PMMA | 1 ml 9:1 CHCl$_3$:EtOH | soluble | 770 | — |
| 30 | 11 | 20 mg | 80 mg PMMA | 1 ml 3:1 CHCl$_3$:EtOH | soluble | 825 | 0.205 μs at 6.26 mW |
| 31 | 12 | 15 mg | 60 mg PMMA | 1 ml 9:1 CHCl$_3$:EtOH | not totally soluble | 769 | — |
| 32 | 16 | 20 mg | 80 mg PMMA | 1 ml 9:1 CHCl$_3$:EtOH | soluble | 767 | 1.45 μs at 6.00 mW |
| 33 | 38 | 20 mg | 80 mg PMMA | 1 ml 9:1 CHCl$_3$:EtOH | soluble | 830 | — |
| 34 | 39 | 20 mg | 80 mg PMMA | 1 ml 9:1 CHCl$_3$:EtOH | soluble | 840 | — |
| 35 | 40 | 15 mg | 80 mg PMMA | 1 ml 6:4 CHCl$_3$:EtOH | soluble | 740 | — |
| 36 | 40 | 15 mg | 80 mg Staybelite E10 | 1 ml 9:1 CHCl$_3$:EtOH | soluble | 760 | — |
| 37 | 40 | 15 mg | 60 mg polybiphenyl acrylate | 1 ml CHCl$_3$ | soluble | 770 | — |
| 38 | 40 | 15 mg | 80 mg PMMA | 1 ml 7:3 CHCl$_3$:EtOH | soluble | 830 | — |
| 39 | 41 | 15 mg | 60 mg PMMA | 1 ml 9:1 CHCl$_3$:EtOH | soluble | 816 | — |
| 40 | 42 | 15 mg | 60 mg PMMA | 1 ml 9:1 CHCl$_3$:EtOH | soluble | 736 | — |
| 41 | 43 | 15 mg | 60 mg PMMA | 1 ml 9:1 CHCl$_3$:EtOH | soluble | 744 | — |
| 42 | 45 | 15 mg | 60 mg PMMA | 1 ml 9:1 CHCl$_3$:EtOH | soluble | 845 | — |
| 43 | 46 | 20 mg | 60 mg PMMA | 1 ml 9:1 CHCl$_3$:EtOH | soluble | 810 | 0.26 μs at 6.26 mW |
| 44 | 49 | 20 mg | 80 mg PMMA | 1 ml 4:1 CHCl$_3$:EtOH | not totally soluble | 830 | — |
| 45 | 49 | 20 mg | 80 mg PMMA | 1 ml 9:1 CHCl$_3$:EtOH | soluble | 830 | 0.77 μs at 6.26 mW |
| 46 | 48 | 20 mg | 80 mg PMMA | 1 ml 4:1 CHCl$_3$:EtOH | soluble | 775 & 900 | — |
| 47 | 48 | 20 mg | 80 mg PMMA | 1 ml 9:1 CHCl$_3$:EtOH | soluble | 775 | 0.50 μs at 6.26 mW |
| 48 | 47 | 20 mg | 80 mg PMMA | 1.5 ml 9:1 CHCl$_3$:EtOH | soluble | 730 | 0.50 μs at 6.26 mW |

EXAMPLES 49 TO 54

Formulations were prepared by dissolving selected dyes in poly(methyl methacrylate) solution in CHCl₃/EtOH. The quantities of components and solvent balance was adjusted such that the dye was dissolved towards the limit of its solubility in the formulation. The formulations were coated on a polyester base (76 μm) using a K bar No. 1. The dyes used and the properties of the coatings are reported in the following Table VIII.

TABLE VIII

| Example No. | Coating optical density at 820 nm | $\lambda_{max}$ nm | Ablation Data (MVMT) |
|---|---|---|---|
| 49 | 0.60 | 733 & 819 | 1.15 μS at 6.79 mW |
| 50 | 0.56 | 820 & >900 | 1.15 μS at 6.79 mW |
| 51 | 0.70 | 806 | 2.75 μS at 6.79 mW |
| 52 | 0.33 | 770 | 0.67 μS at 6.79 mW |
| 53 | 0.67 | 774 | 1.45 μS at 6.79 mW |
| 54 | 0.44 | 742 & 830 | 1.75 μS at 6.79 mW |

I claim:

1. An optical recording element on which information can be recorded and read directly afterwards by means of laser light characterized in that the element comprises, as a recording medium, a substrate having coated thereon and adhered thereto an amount of one or more dyes sufficient to enable optical differentiation between areas exposed and unexposed to a laser beam, said dyes having the formula:

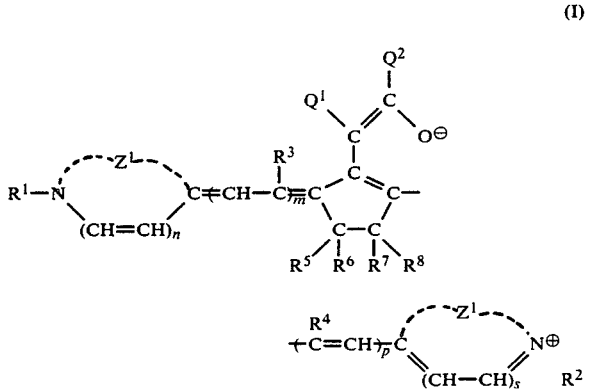

(I)

in which:
m+p=2,
n is 0 or 1,
s is 0 or 1,
$Z^1$ and $Z^2$ independently represent the non-metallic atoms necessary to complete a heterocyclic nucleus of the type present in cyanine dyes,
$R^1$ and $R^2$ independently represent an alkyl or substituted alkyl, alkenyl, substituted alkenyl or aralkyl group of up to 20 carbon atoms,
$R^3$ and $R^4$ independently represent a hydrogen atom or an alkyl, substituted alkyl, alkenyl, substituted alkenyl, alkoxy or substituted alkoxy group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl, alkaryl or substituted alkaryl group, or
one of $R^5$ and $R^6$ together with one of $R^7$ and $R^8$ represent the necessary atoms to complete a carbocyclic ring in which case the others of $R^5$ to $R^8$ are absent, $Q^1$ and $Q^2$ together represent the non-metallic atoms necessary to complete an acidic nucleus of the type present in oxonol or merocyanine dyes.

2. A recording element as claimed in claim 1, characterized in that $Z^1$ and $Z^2$ complete a 5- or 6-membered heterocyclic nucleus which may possess substituents, and said recording element does not contain silver halide.

3. A recording element as claimed in claim 2, characterized in that $Z^1$ and/or $Z^2$ complete a heterocyclic nucleus selected from thiazole, benzothiazole, naphthothiazole, thianaphtheno-7'-6',4,5-thiazole, oxazole, benzoxazole, naphthoxazole, selenazole, benzoselenazole, naphthoselenazole, thiazoline, 2-quinoline, 4-quinoline, 1-isoquinoline, 3-isoquinoline, benzimidazole, 3,3-dialkylindolenine, 2-pyridine, and 4-pyridine, each of which nuclei may be substituted.

4. A recording element as claimed in claim 1, characterized in that $Z^1$ and/or $Z^2$ complete a benzothiazole or a 3,3-dialkylindolenine nucleus, and said recording element does not contain silver halide.

5. A recording element as claimed in claim 1, characterized in that $Q^1$ and $Q^2$ complete a moiety which is a derivative of one of the following nuclei which may optionally possess substituents of indandione, pyrazolone, isoxazolone, oxindole, 2,4,6-trioxohexahydropyrimidine, 2-thio-4,6-dioxohexahydropyrimidine, 3,5-pyrazolidinedione, 2(3H)-imidazo[1,2-a]-pyridone, 5,7-dioxo-6,7-dihydro-5-thiazolo[3,2-a]pyrimidine, 2-thio-2,4-oxazolidindione, thianaphthenone dioxide, 2-thio-2,4-thiazolidindione, 4-thiazolinone, 2-imino-2,4-oxazolinone, 2,4-imidazolinedione, 2-thio-2,4-imidazolinedione, 2-thio-2,4-imidazolinedione cyclic groups, 5,5-dialkyl-1,3-cyclohexanedione or isopropylidine malonate, and said recording element is free of photosensitive material other than said one or more dyes.

6. A recording element as claimed in claim 1, characterized in that $Q^1$ and $Q^2$ complete a moiety of the general formula:

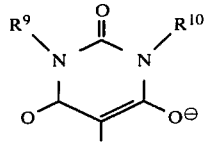

in which:
$R^9$ and $R^{10}$ independently represent a hydrogen atom, an alkyl, substituted alkyl, oxyalkyl, alkenyl, substituted alkenyl, an aryl group which may be substituted or an aralkyl group, any of which groups may contain up to 25 carbon atoms, and said recording element does not contain silver halide.

7. A recording element as claimed in claim 6, characterized in that at least one of $R^9$ and $R^{10}$ represents a group containing at least 8 carbon atoms.

8. A recording element as claimed in claim 6, characterized in that at least one of $R^9$ and $R^{10}$ represents an alkyl group substituted by a solubility enhancing group.

9. A recording element as claimed in claim 8, characterized in that the solubility enhancing group is an alkoxy group.

10. A recording element as claimed in claim 1, characterized in that n=s=0 and m=p=1, and said recording element does not contain silver halide.

11. An optical recording element on which information can be recorded and read directly afterwards by means of laser light characterized in that the element comprises as a recording medium, free of silver halide, (a) a self-supporting film comprising a recording layer of one or more dyes in a binder or (b) a self-supporting film having adhered to at least one surface a recording layer of said one or more dyes in a binder said one or more dyes in a binder being present in an amount sufficient to enable optical differentiation between areas exposed and unexposed to a laser beam, said dyes having the formula:

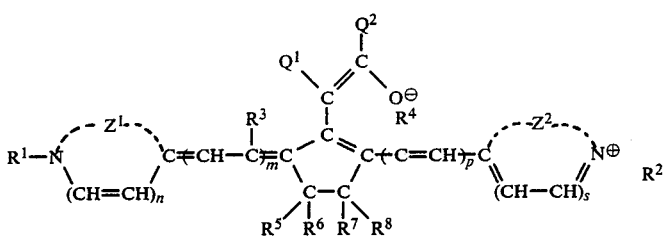

(I)

in which:
m+p=2,
n is 0 or 1,
s is 0 or 1,
$Z^1$ and $Z^2$ independently represent the non-metallic atoms necesary to complete a heterocyclic nucleus of the type present in cyanine dyes,
$R^1$ and $R^2$ independently represent an alkyl or substituted alkyl, alkenyl, substituted alkenyl or aralkyl group of up to 20 carbon atoms,
$R^3$ and $R^4$ independently represent a hydrogen atom or an alkyl, substituted alkyl, alkenyl, substituted alkenyl, alkoxy or substituted alkoxy group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl, alkaryl or substituted alkaryl group, or
one of $R^5$ and $R^6$ together with one of $R^7$ and $R^8$ represent the necessary atoms to complete a carbocyclic ring in which case the others of $R^5$ to $R^8$ are absent,
$Q^1$ and $Q^2$ together represent the non-metallic atoms necessary to complete an acidic nucleus of the type present in oxonol or merocyanine dyes.

12. A recording element as claimed in claim 11, characterized in that the support bears on the surface thereof a recording layer comprising one or more dyes of formula (I) uniformly dispersed in a polymeric binder, either as a dye/polymer solution or as a microcrystalline dispersion of dye in the binder.

13. A recording element as claimed in claim 12, characterized in that the polymeric binder comprises poly(methyl methacrylate).

14. A recording element as claimed in claim 13, characterized in that the polymeric binder additionally comprises a polyester, polystyrene or poly(α-methyl styrene).

15. A recording element as claimed in claim 10, characterized in that the surface of the substrate to which the recording layer is applied is light reflective or a reflecting layer is interposed between the recording layer and substrate.

16. A recording element as claimed in claim 11, characterized in that a dielectric layer is interposed between the recording layer and the substrate.

17. A recording element as claimed in claim 11, characterized in that the recording layer has a thickness of less than 1 μm.

18. A recording element as claimed in claim 11, characterized in that the recording layer has a thickness in the range 30 to 300 nm.

19. A recording element as claimed in claim 11, characterized in that the binder is present in the recording layer in an amount up to 96% by weight based on the total weight of dye and binder.

20. A recording element as claimed in claim 19, characterized in that the binder is present in the recording layer in an amount in the range 5 to 80%.

21. A recording element as claimed in claim 11, characterized in that the surface of the substrate to which the recording layer is applied is grooved.

22. A recording element as claimed in claim 11, characterized in that the substrate is substantially planar having on each major surface a reflecting layer above which is coated a recording layer.

23. A recording layer as claimed in claim 11, characterized in that the substrate is transparent to laser light.

24. A recording element as claimed in claim 11, characterized in that the top surface of the recording layer is protected by an overcoat layer of material transparent to near infrared radiation either directly in contact with said recording layer or separated from said recording layer by (a) a clean, sealed, air gap, or (b) unreactive gas gap, or (c) vacuum gap.

25. An optical recording element on which information can be recorded and read directly afterwards by means of laser light characterized in that the element comprises a substrate having adhered thereto an organic polymeric binder layer having a thickness of from 10 to 1,000 nm, said binder layer containing sufficient dye therein to form a visible mark by absorption of radiation from a laser emitting radiation at a wavelength to which said dye is sensitive, said dye comprising one or more dyes of the formula:

(I)

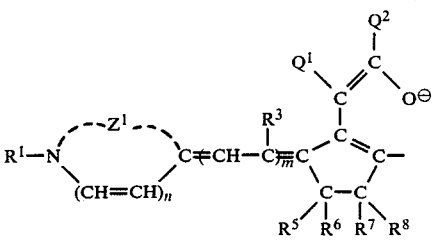

-continued

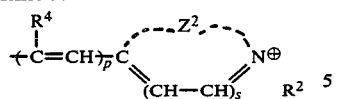

in which:
m+p=2,
n is 0 or 1,
s is 0 or 1,
$Z^1$ and $Z^2$ independently represent the non-metallic atoms necessary to complete a heterocyclic nucleus of the type present in cyanine dyes,
$R^1$ and $R^2$ independently represent an alkyl or substituted alkyl, alkenyl, substituted alkenyl or aralkyl group of up to 20 carbon atoms,
$R^3$ and $R^4$ independently represent a hydrogen atom or an alkyl, substituted alkyl, alkenyl, substituted alkenyl, alkoxy or substituted alkoxy group of up to 10 carbon atoms,
$R^5$, $R^6$, $R^7$ and $R^8$, which together may not contain more than 12 carbon atoms, independently represent a hydrogen atom, an alkyl, substituted alkyl, alkenyl, substituted alkenyl, aryl, alkaryl or substituted alkaryl group, or
one of $R^5$ and $R^6$ together with one of $R^7$ and $R^8$ represent the necessary atoms to complete a carbocyclic ring in which case the others of $R^5$ to $R^8$ are absent,
$Q^1$ and $Q^2$ together represent the non-metallic atoms necessary to complete an acidic nucleus of the type present in oxonol or merocyanine dyes.

* * * * *